(12) United States Patent
Feng et al.

(10) Patent No.: US 9,047,114 B2
(45) Date of Patent: *Jun. 2, 2015

(54) METHOD AND SYSTEM FOR ANALYZING PARALLELISM OF PROGRAM CODE

(75) Inventors: Bo Feng, Beijing (CN); Rong Yan, Beijing (CN); Kun Wang, Beijing (CN); Hua Yong Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 13/613,572

(22) Filed: Sep. 13, 2012

(65) Prior Publication Data

US 2013/0007536 A1   Jan. 3, 2013

Related U.S. Application Data

(63) Continuation of application No. 12/141,571, filed on Jun. 18, 2008, now Pat. No. 8,316,355.

(30) Foreign Application Priority Data

Jun. 18, 2007   (CN) .......................... 2007 1 0109089

(51) Int. Cl.
*G06F 11/34* (2006.01)
*G06F 9/45* (2006.01)

(52) U.S. Cl.
CPC ...................................... *G06F 8/456* (2013.01)

(58) Field of Classification Search
CPC ...................................................... G06F 8/456
USPC ........................................................ 717/135
See application file for complete search history.

(56) References Cited

U.S. PATENT DOCUMENTS

| 6,230,313 | B1 | 5/2001 | Callahan, II et al. |
| 7,162,401 | B1 * | 1/2007 | Abeles ............................ 703/13 |
| 8,190,807 | B2 * | 5/2012 | Reid et al. ......................... 711/3 |

(Continued)

FOREIGN PATENT DOCUMENTS

CN   1645339   7/2005

OTHER PUBLICATIONS

Li, M., "Parallelism Analysis and Optimization in SPEFY, a Programming Environment," Computer Physics Communications 79 (1994) 1-12, SSDI 0010-4655(93)E0133-8.*

(Continued)

*Primary Examiner* — Wei Zhen
*Assistant Examiner* — Mohammed Huda
(74) *Attorney, Agent, or Firm* — Fleit Gibbons Gutman Bongini & Bianco PL; Thomas Grzesik

(57) ABSTRACT

Methods and systems are provided for analyzing parallelism of program code. According to a method, the sequential execution of the program code is simulated so as to trace the execution procedure of the program code, and parallelism of the program code is analyzed based on the result of the trace to the execution procedure of the program code. Execution information of the program code is collected by simulating the sequential execution of the program code, and parallelism of the program code is analyzed based on the collected execution information, so as to allow programmers to perform parallel task partitioning of the program code with respect to a multi-core architecture more effectively, thus increasing the efficiency of parallel software development.

20 Claims, 10 Drawing Sheets

(56) References Cited

U.S. PATENT DOCUMENTS

| | | | |
|---|---|---|---|
| 2003/0041308 A1* | 2/2003 | Ganesan et al. | 716/4 |
| 2003/0120460 A1 | 6/2003 | Aubury | |
| 2005/0188364 A1* | 8/2005 | Cockx et al. | 717/159 |
| 2006/0005194 A1* | 1/2006 | Kawahara et al. | 718/100 |
| 2006/0101416 A1* | 5/2006 | Callahan et al. | 717/128 |
| 2007/0130114 A1* | 6/2007 | Li et al. | 707/2 |
| 2007/0169028 A1* | 7/2007 | Kasten et al. | 717/140 |
| 2007/0234327 A1* | 10/2007 | Baxter et al. | 717/151 |

OTHER PUBLICATIONS

Saito et al., Automatic parallelism analysis of C programs with dynamic memory allocations, J. Fac. Eng., Seikei Univ., 2003, pp. 25-33, vol. 40 No. 2.*

Guo, L, "Develop Direct Acyclic Graph (DAG) Corresponding to Serial Program," Computer Engineering and Applications, 2007, 43(1):41-43.

Office Action for Chinese Patent Application Serial No. 200710109089.5, dated Dec. 6, 2010.

Herbordt & Weems, An Environment for Evaluating Architectures for Spatially Mapped Computation: System Architecture and Preliminary Results, Department of Computer Science, 25 pages, University of MA.

Schnitta & Rosenblum, EMUL—A Parallel Processor Emulator, Sep. 1988, 4 pages, 13.2.1 CH2537 1988 IEEE, Hazeltine Research Laboratories, Greenlawn, NY.

Kaiser, Loop Optimization Techniques on Multi-Issue Architectures, 1994, 194 pages, University of Michigan.

Armstrong, J.L. et al., Implementing a Functional Language for Highly Parallel Real Time Applications, SETSS 92, Mar. 30-Apr. 1, 1992, 7 pages, Florence.

Mc Avaney, Paratielising Compilers for Clusters of Workstations, 15 pages, Deakin University, Geelong, Victoria.

* cited by examiner

```
00001: #include <stdlib.h>
00002:
00003: #define MAX_LEN 4
00004: #define STEP 2
00005:
00006: int Add (int *a, int *b, int offset, int len)
00007: {
00008:     int i = 0;
00009:     int * p = malloc(len);
00010:
00011:     for (i = offset; i < offset + len; i++)
00012:     {
00013:         a[i] = a[i] + b[i];
00014:     }
00015:     free(p);
00016:     return 0;
00017: }
00018:
00019: int main()
00020: {
00021:     int i = 0, a_array[MAX_LEN], b_array[MAX_LEN];
00022:
00023:     for (i = 0; i < MAX_LEN; i += STEP)
00024:     {
00025:         Add(a_array, b_array, i, STEP);
00026:     }
00027:     return 0;
00028: }
```

FIG. 3 (a)

| timestamp | function name | line# | variable name | memory address | memory type | access type | invocation information |
|---|---|---|---|---|---|---|---|
| 1 | main | 21 | i | 0x12fed4 | local | WRITE | main() begins |
| 2 | Add | 08 | i | 0x130ed8 | local | WRITE | Add() begins |
| 3 | Add | 09 | p | 0x218890 | local | WRITE | malloc() called |
| 4 | Add | 13 | a[i] | 0x12febc | non-local | READ | |
| 5 | Add | 13 | b[i] | 0x12fea4 | non-local | READ | |
| 6 | Add | 13 | a[i] | 0x12febc | non-local | WRITE | |
| 7 | Add | 13 | a[i] | 0x12fec0 | non-local | READ | |
| 8 | Add | 13 | b[i] | 0x12fea8 | non-local | READ | |
| 9 | Add | 13 | a[i] | 0x12fec0 | non-local | WRITE | |
| 10 | Add | 15 | p | 0x218890 | local | WRITE | free() called, Add() ends |
| 11 | main | 23 | i | 0x12fed4 | local | READ | |
| 12 | main | 23 | i | 0x12fed4 | local | WRITE | |
| 13 | Add | 08 | i | 0x130ed8 | local | WRITE | Add() begins |
| 14 | Add | 09 | p | 0x218890 | local | WRITE | malloc() called |
| 15 | Add | 13 | a[i] | 0x12fec4 | non-local | READ | |
| 16 | Add | 13 | b[i] | 0x12feac | non-local | READ | |
| 17 | Add | 13 | a[i] | 0x12fec4 | non-local | WRITE | |
| 18 | Add | 13 | a[i] | 0x12fec8 | non-local | READ | |
| 19 | Add | 13 | b[i] | 0x12feb0 | non-local | READ | |
| 20 | Add | 13 | a[i] | 0x12fec8 | non-local | WRITE | |
| 21 | Add | 15 | p | 0x218890 | local | WRITE | free() called, Add() ends |
| 22 | main | 23 | i | 0x12fed4 | local | READ | |
| 23 | main | 23 | i | 0x12fed4 | local | WRITE | main() ends |

FIG. 3 (b)

```
int Add( int* a, int* b, int offset, int len )
{
    int i = 0;
    for( i = offset; i < offset + len; i ++ )
    {
        a[i] = a[i] + b[i];
    }
    return 0;
} int main()
{
    int i = 0;
    int i = 0, a_array[MAX_LEN], b_array[MAX_LEN];
    for ( i = 0; i < MAX_LEN; i += STEP )
    {
        Add( a_array, b_array, i, STEP );
    }
    return 0;
}
```

| timestamp | function name | line# | variable name | memory address | memory type | access type | invocation information |
|---|---|---|---|---|---|---|---|
| 1 | main | 38 | i | 0x12fcd4 | local | WRITE | main() begins |
| 2 | Add | 20 | a[i] | 0x12febc | non-local | READ | Add() begins |
| 3 | Add | 21 | b[i] | 0x12fea4 | non-local | READ | |
| 4 | Add | 22 | a[i] | 0x12fcbc | non-local | WRITE | |
| 5 | Add | 20 | a[i] | 0x12fec0 | non-local | READ | |
| 6 | Add | 21 | b[i] | 0x12fca8 | non-local | READ | |
| 7 | Add | 22 | a[i] | 0x12fec0 | non-local | WRITE | Add() ends |
| 8 | main | 42 | i | 0x12fed4 | local | READ | |
| 9 | main | 43 | i | 0x12fcd4 | local | WRITE | |
| 10 | Add | 20 | a[i] | 0x12fec4 | non-local | READ | Add() begins |
| 11 | Add | 21 | b[i] | 0x12fcac | non-local | READ | |
| 12 | Add | 22 | a[i] | 0x12fec4 | non-local | WRITE | |
| 13 | Add | 20 | a[i] | 0x12fec8 | non-local | READ | |
| 14 | Add | 21 | b[i] | 0x12feb0 | non-local | READ | |
| 15 | Add | 22 | a[i] | 0x12fec8 | non-local | WRITE | Add() ends |
| 16 | main | 42 | i | 0x12fed4 | local | READ | |
| 17 | main | 43 | i | 0x12fed4 | local | WRITE | main() ends |

FIG. 5 (b)

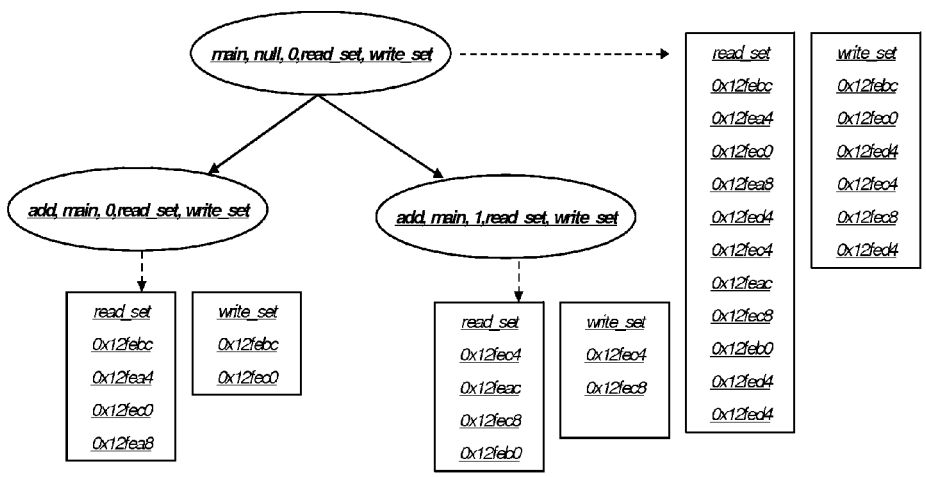

FIG. 5 (c)

```
A() {            a() {                        b() {
    a();             int i=10;                    int j=8;
    b();             char * p = malloc(i);        char * q = malloc(j);
}                    free(p);                     free(q);
                 }                            }
```

FIG. 11

```
a() {                         b() {
    lock(&i);                     lock(&i);
    int j;                        int k;
    j++;                          k++;
    unlock(&i);                   unlock(&i);
}                             }
```

FIG. 12

```
mutex i;
ITEM data[ARRAY_SIZE];
a()
{
    lock(&i);
    for (int j=0;j<ARRAY_SIZE;j+=2)
    {
        data[j] = ...
    }
    unlock(&i);
}
b()
{
    lock(&i);
    for (int j=1;j<ARRAY_SIZE;j+=2)
    {
        data[j] = ...
    }
    unlock(&i);
}
```

FIG. 13

METHOD AND SYSTEM FOR ANALYZING PARALLELISM OF PROGRAM CODE

CROSS-REFERENCE TO RELATED APPLICATIONS

This application is a continuation of and claims priority from U.S. application Ser. No. 12/141,571 filed on Jun. 18, 2008, now U.S. Pat. No. 8,316,355, which is based on based upon and claims priority from Chinese Patent Application No. 200710109089.5, filed Jun. 18, 2007, the disclosures of which are hereby incorporated by reference in their entirety.

FIELD OF THE INVENTION

The present invention relates to the field of data processing, and more particularly relates to a method and system for analyzing parallelism of program code based on emulation for a multi-core architecture, and an emulator for tracing the execution of program code.

BACKGROUND OF THE INVENTION

As continuously increasing demands are placed on computers, the capability of a single processor (primary frequency, line width, etc.) also increases continuously. However, it can be predicted that such increases in the capability of the single processor will finally reach a high-point. Thus, when the capability of a single processor increases to a certain point, in order to continuously obtain higher microprocessor performance, it has to be developed in a different direction. The main factors for promoting the continuous increases in microprocessor performance are rapid progress in semiconductor manufacturing technology and the continuous development of the processor architecture. By using the current semiconductor manufacturing technology, the number of transistors integrated in a microprocessor can reach several hundred million, and the structure of a microprocessor is ensured to develop in a more complicated direction. Thus, under such technical development and demands, the multi-core (multiprocessor) architecture becomes essential.

The multi-core architecture enhances the parallelism of program execution by integrating a plurality of microprocessor cores on a chip. Each microprocessor core is a relatively simple single-thread microprocessor or a comparatively simple multi-thread microprocessor in nature. In the multi-core architecture, the plurality of microprocessors can execute tasks in parallel, so that the parallelism at the thread level is relatively high. Further, the multi-core architecture can obtain such advantages as high primary frequency, short design and validation period, simple control logic, good expansibility, easy implementation, low power consumption, and low communication delay, by adopting relatively simple microprocessors as the processor cores. Therefore, in the future development trend, no matter whether it is a mobile application, an embedded application, a desktop application or a server application, the multi-core architecture will be adopted.

However, while the multi-core architecture has a lot of advantages, it also creates system and program design challenges and other challenges. That is, because the multi-core architecture encapsulates a plurality of processor "execution cores" in a single processor, as long as the design of software is appropriate, the complete parallel execution of a plurality of threads of the software can be supported by the multi-core architecture. Accordingly, the design of such a multi-core architecture forces the development of software to go in the parallelization direction, so as to realize the advantages of the multi-core architecture.

However, under the x86 architecture, developers of application programs still remain in the single thread development mode. As the multi-core architecture is being gradually employed on PCs, servers, embedded systems, game consoles, and so on, traditional sequential programming concepts under the x86 architecture will be weakened by the concurrency and synchronization. Especially for a programmer on CELL multi-core architecture like heterogeneous memory constraint systems (in which each processor core has a limited 256 KB local storage), the programmer should transform from a sequential programming design concept to a parallel one. That is, programmers should learn how to design application programs for a multi-core architecture like CELL (i.e., learn how to carry out parallel program design). However, in parallel program design, identification of parallelism and partition of parallel tasks of the functions in program code are always considered as a kind of art that is highly dependent on the programmers' domain knowledge, experience and architectural understanding. Without enough support tools, parallelism analysis and task partitioning greatly reduce the overall parallel software development productivity.

Therefore, there is a need for an efficient and accurate technology for analyzing parallelism of program code to facilitate the design of parallel programs to perform parallelism analysis and task partitioning of program code more efficiently with respect to a multi-core architecture so as to increase the efficiency of the development of parallelism software.

SUMMARY OF THE INVENTION

According to one aspect of the present invention, there is provided a method for analyzing parallelism of program code. The sequential execution of the program code is simulated so as to trace the execution procedure of the program code, and parallelism of the program code is analyzed based on a result of the trace of the execution procedure of the program code.

According to another aspect of the present invention, there is provided an emulator for tracing an execution procedure of program code. The emulator includes a simulated execution environment for simulating an execution environment of a target system in which the program code will be executed sequentially, and an execution procedure tracing unit for tracing the sequential execution of the program code in the simulated execution environment so as to obtain execution information of the program code.

According to a further aspect of the present invention, there is provided a system for analyzing parallelism of program code. The system includes an emulator for tracing an execution procedure of program code, and a parallelism analyzing unit for analyzing parallelism of the program code based on a result of a trace of the execution procedure of the program code obtained by the emulator.

BRIEF DESCRIPTION OF THE DRAWINGS

It is believed that the above features, advantages and object of the present invention can be better understood from the description of embodiments of the present invention in conjunction with the drawings, in which:

FIGS. 3(a) and 3(b) are an example of the logging of execution information according to an embodiment of the present invention;

FIGS. 5(a)-5(c) are examples of the parallelism analysis process according to an embodiment of the present invention;

FIGS. 11-13 are examples of program code.

DETAILED DESCRIPTION

In a multi-core architecture, for an application program having a great deal of calculations, there will be a lot of data processing and complicated data dependency. If data partitioning is not performed, then only a low frequency single core performs serial processing, so the execution period will be very long. Thus, in the multi-core architecture, parallelization should be correctly performed on such an application program.

The parallelization of an application program is in fact the compressing of the time complexity of a lengthy serial algorithm by way of increasing the space complexity, reconstructing the past algorithm structure in which one operation is executed in one cycle as the parallel algorithm in which a plurality of operations are executed in one cycle, which is the main task of parallelization. That is, parallelization finds the tasks that can be executed in parallel in an application program, and allocates them to a plurality of processor cores to execute in parallel, so that more than one event occurs at one time or in one period. But this kind of parallelization is not a simple process, because even if a plurality of processor cores in the multi-core architecture can execute a plurality of tasks in a program simultaneously, there may be a conflict of operation resource among the tasks. During the simultaneous operation of the plurality of processor cores, a lot of resources (such as cache, memory and BUS, etc.) are in fact shared. If the parallelization is incorrect, for example if parallelization is performed on tasks that cannot be executed in parallel, then the execution result obtained by the application program may be incorrect. For example, if tasks that can be executed in parallel originally are not parallelized, then the result is the reduction of utilization efficiency of the processor cores. In view of this, the present invention provides systems and methods for analyzing parallelism of program code efficiently, to release programmers from complicated parallelism identification and task partitioning.

Preferred embodiments of the present invention will be described in detail hereinafter in conjunction with the drawings.

Figure 1:
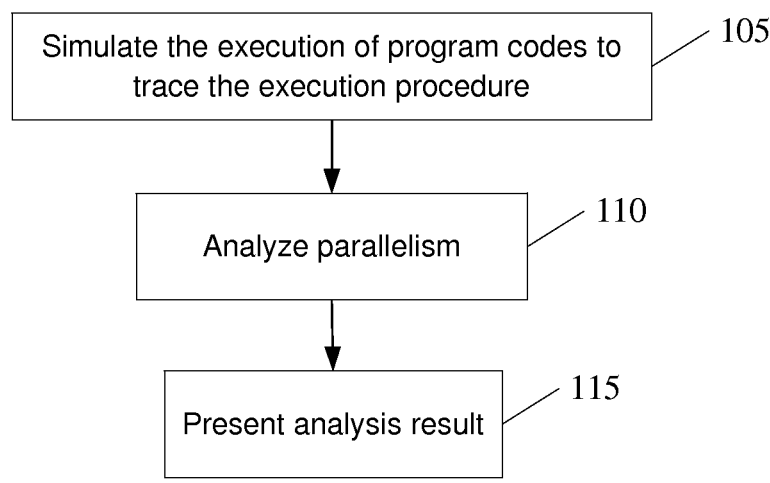
FIG. 1 is a flowchart of a method for analyzing parallelism of program code according to an embodiment of the present invention.

FIG. 1 is a flowchart of a method for analyzing parallelism of program code according to an embodiment of the present invention. As shown in FIG. 1, first at step 105, the sequential execution of the program code is simulated to trace the execution procedure of the program code. Specifically, at this step, first, for the program code for which parallelization analysis is to be performed and the design of which has been completed, the execution environment of its target system is simulated, and the program code is executed sequentially in the simulated execution environment. At the same time as the sequential execution, the execution procedure is traced. At this step, the object of simulating the sequential execution of the program code in the target execution environment is to collect its execution information for use in the analysis of the parallelism of the program code. In one embodiment of the present invention, the above execution information includes but is not limited to function call information, memory allocation information and memory access information. This step will be described in detail below in conjunction with FIGS. 2-3(b).

At step 110, parallelism of the program code is analyzed. Specifically, at this step, dependencies among function calls in the program code are analyzed based on the tracing result of the sequential execution procedure of the program code (i.e., the execution information collected at step 105). At this step, the function calls in the program code that do not conflict for memory access are determined as ones having no dependency. This step will be described in detail below in conjunction with FIGS. 4 and 5.

This embodiment of the present invention optionally comprises step 115 in which the analysis result for parallelism of the program code is presented to the user. Specifically at this step, what is presented to the user is the dependencies among the function calls in the program code determined at step 110, to allow the designer of the program code to find the tasks in the program code that have no dependency so that they can be executed in parallel by a plurality of processor cores. In one embodiment, the dependencies among the function calls in the program code are expressed in the form of a tree diagram. The tree diagram will be detailed below in conjunction with FIGS. 4 and 5. In addition, in other embodiments, the dependencies among the function calls in the program code are presented in any other form, such as a list, text, etc.

The execution procedure tracing step 105 in the method of FIG. 1 will be described in detail in conjunction with FIG. 2, which is a detailed flowchart of the execution procedure tracing step 105.

Figure 2:
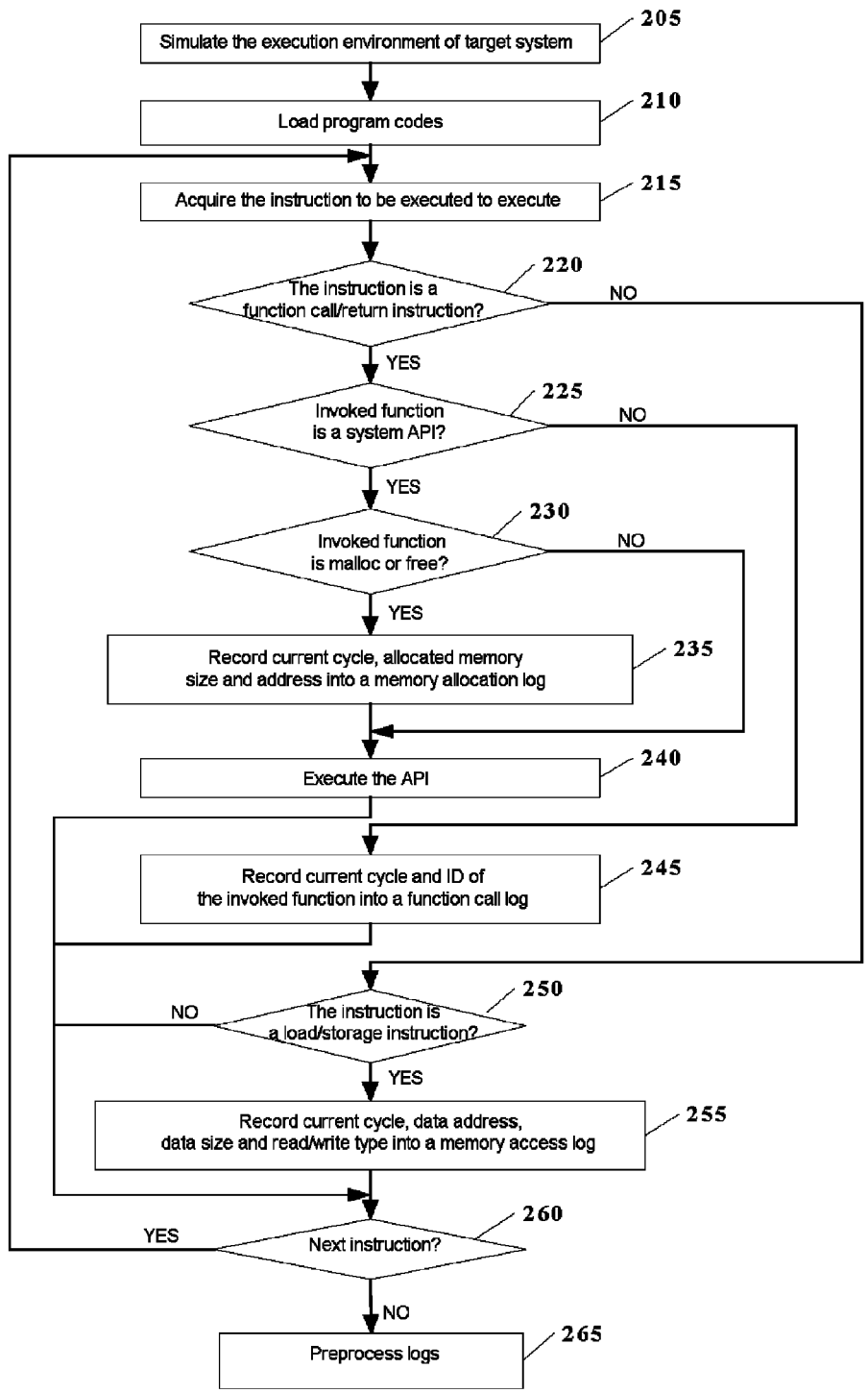
FIG. 2 is a detailed flowchart of the execution procedure tracing in the method of FIG. 1.

As shown in FIG. 2, first at step 205, for program code for which parallelism analysis is to be performed, the execution environment of its target system is simulated. Specifically, in this embodiment this step is implemented by using an emulator. That is, at this step, the target system on which the program code is to be used practically is simulated on a main system (current system) by using an emulator to provide the execution environment of the target system for the program code. In this embodiment of the present invention, the target system is a CELL multi-core system (i.e., the program code for which parallelism analysis is to be performed is designed for the CELL system). In addition, in this embodiment of the present invention, the simulated execution environment comprises a simulated memory, a memory management unit, a pipeline and a simulated register, and so on, which are the most basic system components for the execution of the program code. However, the present invention is not limited to this. As long as the sequential execution of the program code can be ensured and what is simulated is the environment of the target system, the execution environment can comprise any other system components. The above emulator will be detailed below in conjunction with FIGS. 7-10.

Next, at step 210, the program code is loaded into the simulated execution environment of the target system. Specifically, at this step, the program code is loaded into the simulated memory in the simulated execution environment, and a symbol table in the program code is analyzed to obtain the addresses of the functions in the program code. Because the name, size and memory address of each function in the program code are recorded in the symbol table, the address of each function can be obtained according to the corresponding name of the function.

At step 215, an instruction to be currently executed in the program code is acquired for execution. Specifically, because the value of the simulated instruction register in the simulated execution environment indicates the virtual address of the instruction to be currently executed, at this step, first the virtual address in the simulated instruction register is acquired and transferred to the memory management unit so as to convert the virtual address into a physical address; then according to the acquired physical address, the instruction to be executed is acquired from the corresponding location of the simulated memory, and decoded into a binary format for execution. In the meantime, the simulated instruction register automatically points to the next instruction to be executed.

Next the subsequent steps 220-255 trace the execution procedure of the program code and record execution information.

At step 220, it is determined whether the instruction is a function call/return instruction such as a call (x86) or bl (PPC). If so, the process proceeds to step 225, otherwise the process turns to step 250.

At step 225, for the current instruction that was determined to be a function call/return instruction at step 220, it is further determined whether the function it invokes is a system API (Application Programming Interface) such as a C library function. If so, the process proceeds to step 230, otherwise the process turns to step 245.

At step 230, for the current instruction that was determined as a function call/return instruction at step 220, it is further determined whether the function it invokes is a memory allocation instruction or a free instruction (i.e., instruction "malloc" or "free"). If so, the process proceeds to step 235, otherwise the process proceeds to step 240.

Next, because it was determined at step 230 that the function the current instruction invokes is "malloc" or "free" among the system APIs, at step 235, the related memory allocation/free information during the execution of the current instruction is recorded into a memory allocation log. Specifically, at this step, the system cycle (time information), allocated memory size and memory address during the execution of the current instruction are recorded into the memory allocation log. Then the process proceeds to step 240 to execute the system API invoked by the instruction.

Next, since it was determined at step 225 that the current instruction is a function call/return instruction and the function it invokes is not a system API, then at step 245, the related function call information during the execution of the current instruction is recorded into a function call log. Specifically, at this step, the system cycle and the ID of the function invoked by the current instruction during the execution of the instruction are recorded into the function call log. In order to facilitate user identification, preferably the ID of the function adopts the name of the function. However, because during the execution of the instruction the function it invokes is indicated by an address, before being recorded into the log, the address of the invoked function is first converted into the corresponding name of the function according to the symbol table in the program code mentioned above, and then the name of the function is recorded into the log.

Next at step 250, for the current instruction that was determined as not being a function call/return instruction at step 220, it is further determined whether it is a load/store instruction. If so, the process proceeds to step 255, otherwise it turns to step 260 to determine whether there exists a next instruction.

Next, since it was determined at step 250 that the current instruction is a load/store instruction, at step 255, the related memory access information during the execution of the current instruction is recorded into a memory access log. Specifically, at this step, the system cycle, data address and data size accessed by the current instruction, and read/write type during the execution of the instruction are recorded into the memory access log. Then the process proceeds to step 260 to determine whether there exist a next instruction.

At step 260, if there exists a next instruction, then the process returns to step 215 to continue to acquire and execute the next instruction. If there is no next instruction, then the process proceeds to step 265.

At step 265, the logs generated through the above steps 215-260 are preprocessed. Specifically, at this step, the locality or non-locality of the memory access operations or memory allocation operations of each function in the program code are analyzed, and the memory type item in the records corresponding to the memory access operations or memory allocation operations is correspondingly set in the above mentioned logs. For example, if variable i is a local variable in function A, then for the memory access operations with respect to variable i in function A, the memory type item in the records corresponding to the memory access operations is set as local in the logs to indicate that the memory access operations do not depend on the memory operations in other functions, and can be performed locally.

The exemplary case shown in FIGS. 11-13 will now be described.

In FIG. 11, seemingly, function a( ) and b( ) have overlapping parts on memory operations on stack (i and j) and heap (p and q), but in fact, it can be analyzed from the main code sections of the two functions that they do not conflict in memory operations, and can be allocated to different processor cores to execute on the basis of the local memories of the processor cores. Therefore, in this case, the memory type in the records corresponding to the stack (i, j) and heap (p, q) operations of the two functions is set as local in the logs to indicate the heap and stack operations do not depend on or conflict with heap and stack operations with respect to the same variables in other functions, and can be performed locally.

Further in FIGS. 12 and 13, respectively, it can be seen that both functions a( ) and b( ) use the same lock i to protect their critical sections. However, it can be seen from the main code sections of the two functions that they do not operate on the same memory variable, thus there is no conflict in memory operations. Therefore, in this case, the memory type in the records corresponding to the locking operations of the two functions is set as local in the logs so as to indicate the locking operations do not conflict with locking operations with respect to the same variable in other functions and can be performed locally.

Hereinafter, a specific example is given to describe the tracing result obtained by using the process of FIG. 2. FIG. 3(*a*) shows two segments of simple program code, in which main( ) is a main function and add( ) is a subfunction invoked by the main function. FIG. 3(*b*) is a log in which the execution information of the two segments of program code of FIG. 3(*a*) is recorded. It can be seen that the log sequentially records all of the memory access information, memory allocation information, function call information and so on of the execution procedures of the two segments of program code in the order of timestamp (execution cycle). The specific meaning of each field in the log is shown in FIG. 3(b).

The above is a detailed description of the execution procedure tracing step of FIG. 2. It should be noted that, in the process shown in FIG. 2, although the process of recording execution information at steps 220-250 is performed after the execution of the instruction at step 215, this is only for the purpose of convenience for description, but is not limitative. In a practical implementation, steps 220-250 can be performed simultaneously with the execution of the instruction of step 215.

In addition, it is also noted that, in the above process shown in FIG. 2, although the execution information of the program code is classified and recorded into different logs according to the type of instruction, in a practical implementation, all of the execution information of the program code can be recorded using only one log instead of configuring a function call log, a memory allocation log and a memory access log, respectively. In this case, the above plurality of logs can be generated on the basis of the one log during parallelism analysis. Further, in embodiments of the present invention, no matter whether the execution information is recorded using one log or a plurality of logs, the recorded information is not limited to the above function name, memory address, memory type, and so on, but instead, besides the above information types, other more detailed information related to the execution of program code can also be recorded.

The parallelism analysis step 110 in the method of FIG. 1 will be described in detail in conjunction with FIG. 4, which is a detailed flowchart of the parallelism analysis step 110.

Figures 4, 5:
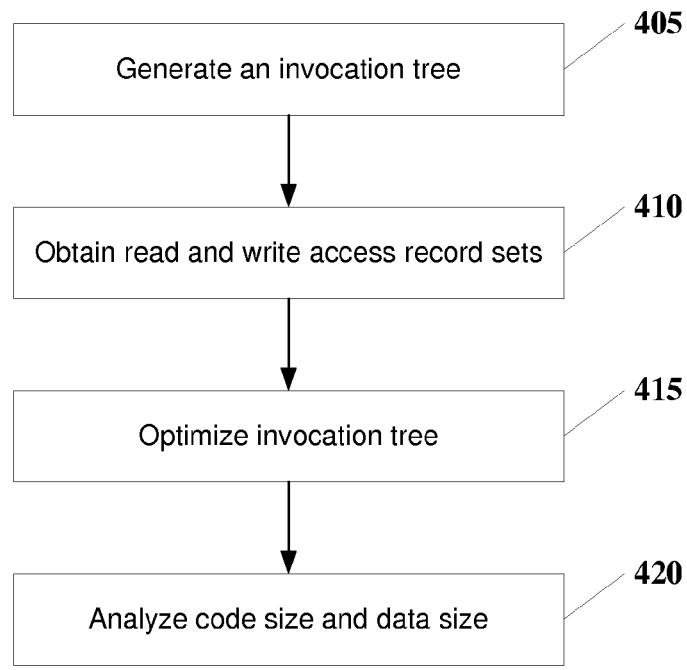
FIG. 4 is a detailed flowchart of the parallelism analysis in the method of FIG. 1.

As shown in FIG. 4, first, at step 405, an invocation tree is generated for the program code for which the parallelism analysis is currently performed. Specifically, at this step, the invocation tree of the program code is generated by representing the main function in the program code with the root node, the function calls of the program code in its sequential execution procedure with nodes under the root node, and the further invocation relations between the function calls with the parent and child relation between corresponding nodes. As described above in conjunction with FIG. 2, all of the information related to various function calls to a non-system API of the program code is recorded in the function call log. Therefore, at this step, the function calls of the program code in its execution procedure can be identified based on the logs generated in the above process of FIG. 2. Each node in the invocation tree generated at this step represents a function call of the program code in its execution procedure, and each node comprises the following items.

Function identification func_id: This is the identification of the invoked function in the function call corresponding to the node. In an embodiment of the present invention, the ID is the name of the invoked function.

Invoked function list callee_list: This is a list of various levels of invoked functions down to the function call corresponding to the node (i.e., which indicates the stack status up to the function call). In an embodiment of the present invention, the list is composed of the names of the various levels of invoked functions. For example, if a main function main( ) invokes a function tree( ), and the function tree( ) further invokes a function node( ) during its execution, then for the invocation of the function node( ), the invoked function list callee_list of its corresponding node is (main, tree).

Invocation number call_number: This is used to differentiate different function calls having identical function IDs and invoked function lists (i.e., which is used to differentiate different invocations of the same function). The invocation number can be represented by a number or by other IDs.

The above items can be obtained by analyzing the function call log generated by the process of FIG. 2.

Next, at step 410, based on the execution information log recorded in the above process of FIG. 2, for each node in the above invocation tree, a read access record set and a write access record set of its corresponding function call are obtained. That is, each node in the above invocation tree further comprises the following items:

Read access record set read_set, which is the set of records of read accesses to a memory during the function call corresponding to the node; and Write access record set write_set, which is the set of records of write accesses to a memory during the function call corresponding to the node.

Because all of the information of the program code related to various function calls to a non-system API and various memory accesses is recorded in the logs, at this step, based on the logs, function calls to a non-system API function of the program code in its execution procedure are identified, and the statistics of the memory access records and write access records during the function calls are obtained, respectively, as the read access record set and write access record set of the node which the function call corresponds to, respectively.

At step 415, the invocation tree is optimized. Specifically, at this step, it is assumed that nodes A and B are two leaf nodes under the same parent node in the invocation tree, if:

1) a record $R_A$ in the read access record set read_set of A and a record $R_B$ in the write access record set write_set of B relate to the same non-local memory address p; or 2) a record $R_A$ in the write access record set write_set of A and a record $R_B$ in the read access record set read_set of B relate to the same non-local memory address p; or 3) a record $R_A$ in the write access record set write_set of A and a record $R_B$ in the write access record set write_set of B relate to the same non-local memory address p.

If so, then the nodes A and B are merged into one new node to indicate the interdependency of A and B. The determination of an identical non-local memory address is made based on the memory address information and memory type information in the read and write access records.

That is, at this step, for the function calls under the same function in the program code, based on the memory address and memory type in each record of their read access record sets and write access record sets, it is determined whether the write access record set of one of the function calls contains the records related to the same non-local memory address as that in the read access record set or write access record set of another of the function calls. If so, then it is determined that the two function calls are dependent on each other and cannot be executed in parallel. Otherwise it is determined that the two function calls are not dependent on each other, and can be executed in parallel.

Step 415 is repeated until there are no such cousin nodes that can be merged in the invocation tree.

Hereinafter, the process of FIG. 4 will be described by way of an example. FIG. 5(a) shows two segments of simple program code, where main( ) is a main function, and add( ) is a subfunction invoked by the main function. FIG. 5(b) shows a log in which the execution information of the two segments of program code of FIG. 5(a) is recorded. It can be seen that the log records all of the memory access information, function call information, and so on of the execution procedures of the two segments of program code sequentially in the order of timestamps (execution cycle). Further, because there is no memory allocation/free instruction "malloc" and "free" in the two segments of program code, no information related to the memory allocation/free is recorded.

Taking the above program code in FIG. 5(a) and the corresponding execution information log in FIG. 5(b) as examples, by using the above process of FIG. 4, the final invocation tree of the program code, a part of which is shown in FIG. 5(c), is obtained. Here, node (add, main, 0, read_set, write_set) and node (add, main, 1, read_set, write_set) cannot be merged, thus indicating that the first invocation and the second invocation of function add( ) by the main function main( ) are not dependent on each other and can be executed in parallel.

The final invocation tree generated by using the process can be presented to the user at the above step 115 of FIG. 1, so as to show the dependencies between the function calls of the program code with the relations between the nodes in the invocation tree, allowing the user to get a direct view of the parallelism of the program code.

In addition, it should be noted that the tree analysis technique adopted by the above parallelism analysis process of FIG. 4 is only one embodiment of the present invention, and is not a limitation. In other embodiments, the analysis and presentation of the dependencies between function calls can be implemented by any form, such as list, text, and so on.

Returning to FIG. 4, the parallelism analysis process can further comprise an optional step 420.

At the optional step 420, for the various levels of function calls of the program code in its execution procedure, code and data sizes are analyzed. Specifically, in one embodiment the step is implemented according to the following formula:

$$\text{self\_code\_seize}(A) = \text{the own code size of function } A$$

$$\text{code\_size}(callA) = \text{self\_code\_size}(A) + \sum_{\substack{\text{Function } f \text{ called by } A \\ \text{during its lifetime}}} (\text{self\_code\_size}(f))$$

$$\text{data\_size}(callA) = \sum_{\substack{\text{memmoryaccess } i \text{ during} \\ A's \text{ lifetime}}} (sizeof(i))$$

That is, at this step, for each function call callA of the program code in its execution procedure, the sum of the code size of the invoked function A itself corresponding to the function call and the code sizes of the functions f invoked further by the function A during the function call callA is obtained as the code size of the function call callA, and the sum of the space sizes accessed in various memory accesses i by the function call callA during its lifetime is obtained as the data size of the function call callA.

The above step 420 is most useful for a case in which the program code for which the parallelism analysis is being currently performed is to be applied to a multi-core architecture like CELL in which each processor core is provided with limited local storage (such as 256 KB). Because in such a system the size of the task (size of code and data) manageable by each processor core is limited by its local storage, when allocating tasks to the processor cores, it should be considered first whether the sizes of the tasks are suitable for the processor cores. However, for a multi-core architecture in which the processor cores are not limited in the local storage size, when performing a parallelism analysis on the program code, it is not necessary to consider whether the sizes of the allocated tasks are suitable for the processor cores, so the above step 420 is not needed.

In addition, if step 420 is performed, the code sizes and data sizes of the function calls obtained at the step should further be presented to the user at the above step 115 of FIG. 1. The code sizes and data sizes of the function calls can be presented along with the corresponding nodes in the invocation tree.

The above is a detailed description of the embodiment of the parallelism analysis process of the program code in FIG. 4. It should be noted that, in the process shown in FIG. 4, although step 410 for obtaining the read access record set and the write access record set is performed after step 405 for generating an invocation tree, this is only for the purpose of convenience, and is not limitative. In a practical implementation, step 410 can be performed while generating the invocation tree at step 405.

The above is a description of the method for analyzing parallelism of program code according to an embodiment of the present invention. It can be seen from the above that this embodiment first collects execution information necessary for the parallelism analysis for the program code by simulating the sequential execution of the program code, then analyzes the dependencies between function calls based on the collected execution information, and then presents the analysis result to the user in a visual form.

Therefore, in this embodiment, owing to the simulation of the practical execution of the program code, the memory access information and the potential dependencies introduced by the system calls controlled by I/O (for example, at the kernel level) can be collected, so the parallelism analysis based thereon will be more accurate and can allow programmers to perform the partitioning of the parallel tasks of the program code with respect to the multi-core architecture more effectively. Further, by using this embodiment, the parallelism analysis for the program code can be performed independently of the hardware and OS of the target system.

In addition, although the above description of the parallelism analysis for the program code is given with respect to the case of a CELL system, the present invention is not so limited. The present invention can also be applied to the parallelism analysis for the program code of other multi-core architectures, such as Simple Scalar, Power system chip, etc.

Figure 6:
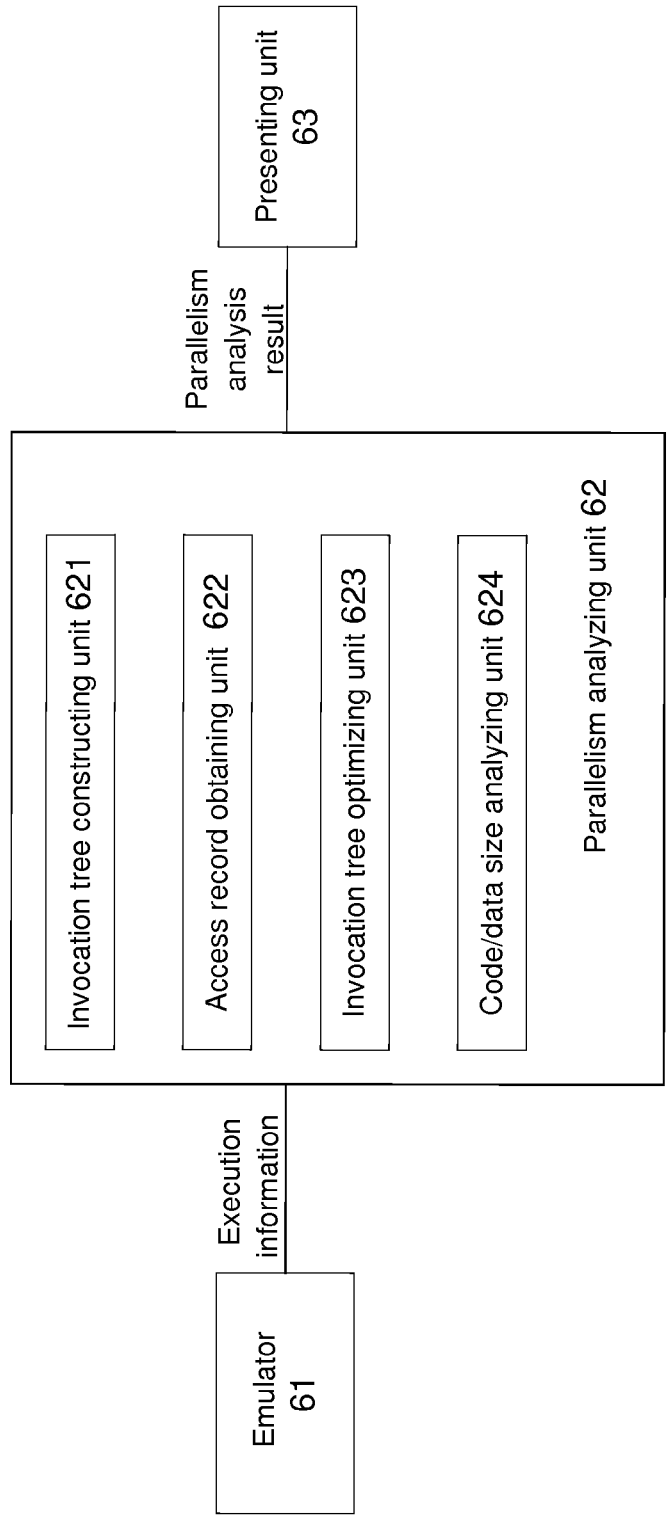
FIG. 6 is a block diagram of a system for analyzing parallelism of program code according to an embodiment of the present invention.

FIG. 6 is a block diagram showing a system for analyzing parallelism of program code according to an embodiment of the present invention.

As shown in FIG. 6, the system for analyzing parallelism of program code according to this embodiment of the present embodiment comprises an emulator 61, a parallelism analyzing unit 62 and a presenting unit 63.

The emulator 61 is used to trace the execution procedure of the program code for which parallelism analysis is to be performed, in order to collect the execution information.

Figure 7:
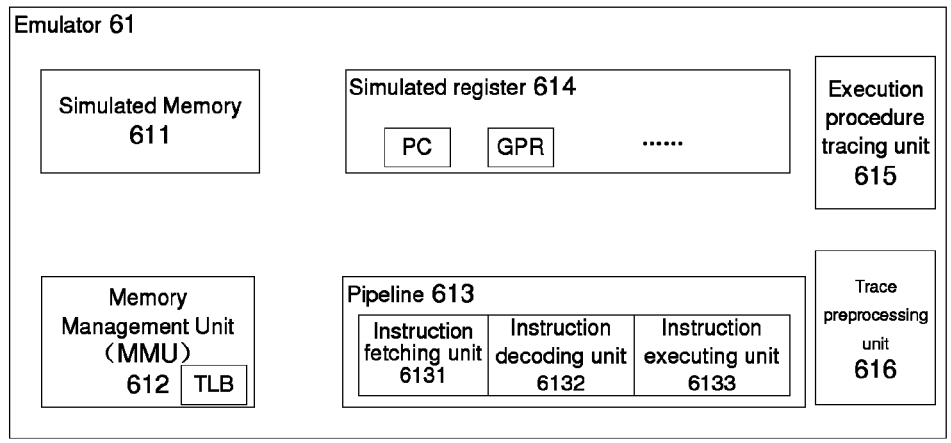
FIG. 7 is a block diagram of the emulator for tracing the execution procedure of program code according to an embodiment of the present invention.

FIG. 7 is a block diagram of the emulator for tracing the execution procedure of program code according to an embodiment of the present invention. As shown in FIG. 7, the emulator 61 according to this embodiment comprises a simulated memory 611, a memory management unit 612, a pipeline 613, a simulated register 614, an execution procedure tracing unit 615 and a trace preprocessing unit 616.

The simulated memory 611 is a memory block allocated from the memory of a main system (current system) and is used as the physical memory in the target system environment simulated by the emulator 61.

The memory management unit (MMU) 612 is used to convert a virtual address into a physical address during the memory access of the program code. The memory management unit 612 comprises a translation look-aside buffer (TLB), which is a cache, and stores the mapping relation between virtual addresses and physical addresses. The address translation performed by the MMU 612 is a searching of the TLB to find a matched pair of virtual address and physical address, thus obtaining the needed physical address.

The pipeline 613 comprises an instruction fetching unit 6131, an instruction decoding unit 6132 and an instruction executing unit 6133. The instruction fetching unit 6131 fetches instructions from the simulated memory 611 into the pipeline 613, the instruction decoding unit 6132 analyzes the binary format of each instruction, and the instruction executing unit 6133 executes the action of each instruction.

The simulated register 614 is used as the register of the target system simulated by the emulator 61, for storing an intermediate calculation result, in which a PC register records the location of the instruction to be executed (virtual address).

The execution procedure tracing unit 615 is used to trace the sequential execution procedure of the program code in the emulator 61 so as to obtain the execution information of the program code. Specifically, this unit determines the type of the current instruction executed in the emulator 61. If the instruction is a function call/return instruction for invoking a non-system API, then the current execution cycle and the ID of the invoked function are recorded into logs. If the instruction is a function call/return instruction for invoking the memory allocation or free function among the system APIs, then the current execution cycle and the allocated memory size, memory address are recorded into the logs. If the instruction is a load/store instruction, then the current execution cycle and data address, data size, read/write type and memory type are recorded into the logs.

The trace preprocessing unit 616 is used for analyzing the corresponding memory type of memory access operations and memory allocation operations recorded in the above logs, and recording the memory type information into the logs.

The operation of the emulator 61 will now be described in conjunction with FIGS. 8-10.

Figure 8:
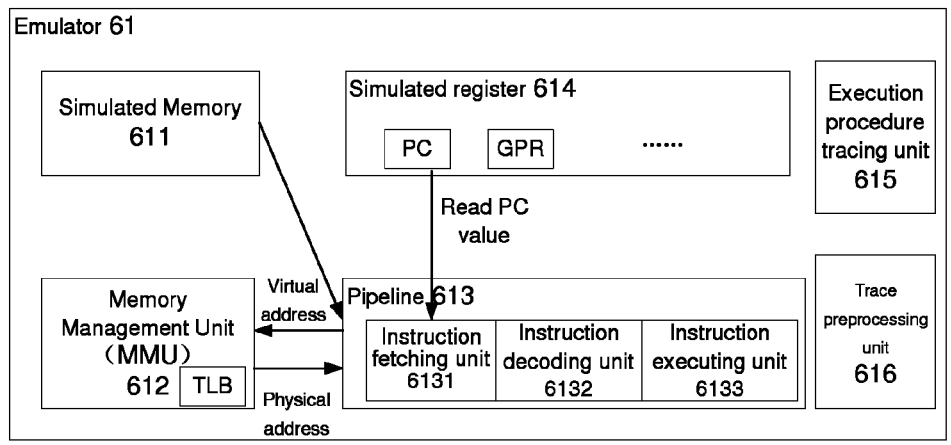
FIGS. 8-10 show the working process of the emulator of FIG. 7.

As shown in FIG. 8, after the emulator 61 starts, the instruction fetching unit 6131 reads the value in the PC register so as to obtain the address of the next instruction, and transfers the address to the memory management unit 612 for conversion from a virtual address to the physical address. Then the instruction fetching unit 6131 reads an instruction from the corresponding location of the simulated memory 611 according to the obtained physical address, while the value of the PC register automatically points to the next instruction.

Figure 9:
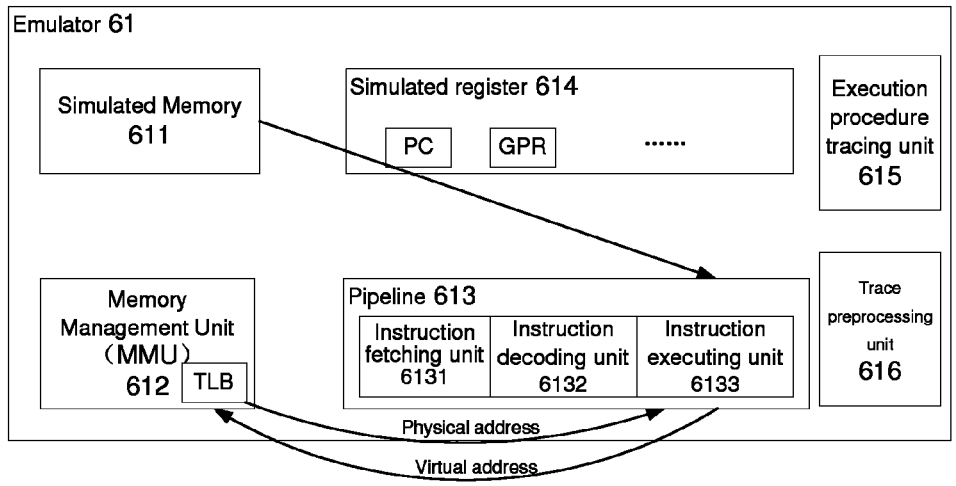

As shown in FIG. 9, when the instruction executing unit 6133 executes a load/store instruction, first the unit obtains a data address from the instruction itself or a register, and transfers the address to the MMU 612 for conversion from a virtual address to the physical address. Then the instruction executing unit 6133 loads or stores data to a corresponding location of the simulated memory 611 according to the obtained physical address, while the execution procedure tracing unit 615 records corresponding memory access information.

Figure 10:
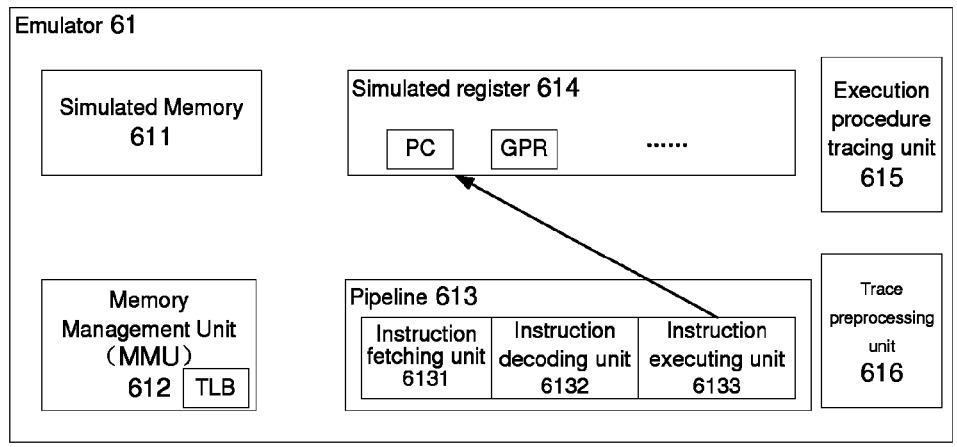

As shown in FIG. 10, when the instruction executing unit 6133 executes a branch instruction, first it updates the value in the PC register to the target address of the branch instruction, and discards all of the instructions in the pipeline 613. Then the instruction fetching unit 6131 fetches a corresponding instruction into the pipeline 613 according to the new value in the PC register, while the execution procedure tracing unit 615 records corresponding function call information.

The above is the detailed description of the emulator for tracing execution procedure of program code according to an embodiment of the present invention. By using the emulator according to this embodiment, execution information, which is detailed and useful for the parallelism analysis of program code, can be obtained.

Returning to FIG. 6, the parallelism analyzing unit 62 is used to, based on the result of the tracing of the execution procedure of the program code by the emulator 61, learn the execution actions as well as time information and memory type information corresponding to the execution actions of the program code in its execution procedure, recorded in the tracing result, to perform the parallelism analysis. As shown in FIG. 6, the parallelism analyzing unit 62 comprises an invocation tree constructing unit 621, an access record obtaining unit 622, an invocation tree optimizing unit 623 and a code/data size analyzing unit 624.

The invocation tree constructing unit 621 is used to, based on the tracing result obtained by the emulator 61, represent the various function calls of the program code in its execution procedure with nodes and the relations between the function calls with the relation between the nodes to generate an invocation tree of the program code.

The access record obtaining unit 622 is used to, based on the tracing result obtained by the emulator 61, for each node in the invocation tree generated by the invocation tree constructing unit 621, obtain the read access record set and write access record set during its corresponding function call.

The invocation tree optimizing unit 623 is used to, for leaf nodes under the same parent node in the invocation tree, based on their read access record sets and write access record sets, determine whether there exists an access conflict between them with respect to a non-local memory address, and further to merge the leaf nodes having a memory access conflict between them with respect to a non-local memory address into one node.

The code/data size analyzing unit 624 is used to, for each of the function calls of the program code in its execution procedure, obtain the sum of the code size of the invoked function itself corresponding to the function call and the code sizes of the functions invoked further by the invoked function during the function call, as the code size of the function call, and obtain the sum of the space sizes accessed in various memory accesses by the function call during its lifetime, as the data size of the function call.

Next, the presenting unit 63 is used to present to the user the analysis result for the parallelism of the program code. In this embodiment, the analysis result comprises a graphical or textual representation of the dependencies between function calls of the program code as well as the code size and data size of each of the function calls.

The above is the description of the system for analyzing parallelism of program code according to an embodiment of the present invention. It can be seen from the above description that this embodiment first collects execution information necessary for the parallelism analysis for the program code with an emulator, then analyzes the dependencies between function calls based on the collected execution information, and then presents the analysis result to user in a visual form.

Therefore, in this embodiment, owing to the simulation of the practical execution of the program code by an emulator, the memory access information and the potential dependencies introduced by the system calls controlled by I/O (for example, at the kernel level) can be collected, so the parallelism analysis based thereon will be more accurate and can allow programmers to perform the partitioning of the parallel tasks of the program code with respect to the multi-core architecture more effectively. Further, by using this embodiment, the parallelism analysis for the program code can be performed independently of the hardware and OS of the target system.

The system for analyzing parallelism of program code and its various components can be implemented by hardware circuitry (such as extremely large scale integrated circuit or gate arrays), semiconductors (such as one or more logic chips or transistors), or programmable hardware devices (such as field programmable gate array, programmable logic device, etc.), or can be implemented in the form of one or more processors executing corresponding software, or can be implemented by a combination of hardware circuitry and corresponding software. And these various components can be physically implemented together, or can be physically independent but operationally interoperable with each other.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Furthermore, embodiments of the present invention may not include all of the features described above. Therefore, it is intended that the present invention not be limited to the particular embodiments disclosed, but that the invention include all embodiments falling within the scope of the appended claims.

What is claimed is:

1. A method for analyzing parallelism of program code, the method comprising:
   simulating sequential execution of the program code so as to trace an execution procedure of the program code; and
   analyzing parallelism of the program code based on a result of the trace of the execution procedure of the program code,
   wherein the analyzing comprises:
   generating an invocation tree for the program code based on the result of the trace, the generating comprising representing function calls of the program code in the execution procedure with nodes, wherein a root node of the invocation tree represents a main function of the program code, wherein each of a set of nodes under the root node represents a function call of the program code, and wherein invocation relations between function calls are represented by parent and child relations between corresponding nodes,
   obtaining, for at least first and second function calls represented by nodes in the invocation tree, a read access record set and a write access record set during the first and second function calls based on the result of the trace, the read access record set recording read accesses to a memory address during a function call, and the write access record set recording write accesses to the memory address during a function call,
   determining for the first function call whether the write access record set associated therewith comprises at least one record related to a same non-local memory address as that in at least one of the read access record set and the write access record set of the second function call,
   determining, responsive to the write access record set of the first function call comprising at least one record related to the same non-local memory address as that in at least one of the read access record set and the write access record set of the second function call, that the first function call and the second function call are dependent on each other and fail to be executable in parallel, and
   determining, responsive to the write access record set of the first function call failing to comprise at least one record related to the same non-local memory address as that in at least one of the read access record set and the write access record set of the second function call, that the first function call and the second function call fail to be dependent on each other and are executable in parallel.

2. The method according to claim 1, wherein the result of the trace of the execution procedure of program code is one or more logs recording at least one of execution actions, time information, and memory type information corresponding to actions of the program code in the sequential execution.

3. The method according to claim 1, wherein the simulating comprises:
   simulating an execution environment of a target system for the program code;
   loading the program code into the simulated execution environment;
   sequentially executing instructions in the loaded program code in the execution environment; and
   recording into logs execution information for the program code in the sequential execution.

4. The method according to claim 3, wherein the recording comprises:
   determining a type of a current instruction in the program code;
   responsive to the current instruction being a function call/return instruction for invoking a non-system API, recording a current execution cycle and an ID of the invoked function into the logs;
   responsive to the current instruction being a function call/return instruction for invoking a memory allocation or free function among the system APIs, recording a current execution cycle, an allocated memory size, and a memory address into the logs; and
   responsive to the current instruction being a load/store instruction, recording a current execution cycle, a data address, a data size, and a read/write type into the logs.

5. The method according to claim 3, wherein the logs comprise a function call log for recording the function call information, a memory allocation log for recording memory allocation information, and a memory access log for recording memory access information of the program code in the sequential execution procedure.

6. The method according to claim 1, wherein the analyzing of the dependencies comprises analyzing the dependencies based on execution actions, time information, and memory type information of the program code in the sequential execution.

7. The method according to claim 1, wherein the analyzing of the dependencies comprises:
   for each of the function calls of the program code in the execution procedure, obtaining a read access record set and a write access record set during the function call based on the result of the trace, the read access record set recording read accesses to a memory during the function call, and the write access record set recording write accesses to the memory during the function call;
   for the function calls within one function, determining whether there exists a memory access conflict between these function calls based on the read access record sets and the write access record sets during these function calls; and
   determining the function calls having memory access conflicts among these function calls within the one function as ones which have dependency and cannot be executed in parallel, and determining the function calls that have no memory access conflict as ones which have no dependency and can be executed in parallel.

8. The method according to claim 1, wherein the analyzing of the dependencies comprises:

nodes and relations between the function calls with the relations between the nodes;

obtaining, for the each of the nodes, a read access record set and a write access record set of the function call represented by the node, wherein the read access set and the write access set are obtained during the function call corresponding to the node based on the result of the trace;

for leaf nodes under one parent node in the invocation tree, determining whether there exists a memory access conflict between these leaf nodes based on their read access record sets and write access record sets; and merging the leaf nodes under the one parent node having a memory access conflict into one node.

9. The method according to claim 1, wherein the analyzing parallelism of the program code comprises analyzing code size and data size for each function call of the program code in the execution procedure based on the result of the trace of the execution procedure of the program code.

10. The method according to claim 9, wherein the analyzing of the code size and the data size comprises, for each of the function calls of the program code in the execution procedure:

obtaining a sum of the code size of a function invoked by the function call and the code sizes of further functions invoked by the function invoked by the function call, as the code size of the function call; and obtaining a sum of the memory space sizes accessed in memory accesses by the function call in its lifetime, as the data size of the function call.

11. The method according to claim 1, wherein the analyzing of the dependencies comprises:

for at least first and second function calls represented by nodes in the invocation tree, obtaining a read access record set and a write access record set during the first and second function calls, respectfully, based on the result of the trace, the read access record set recording read accesses to a memory address during a function call, and the write access record set recording write accesses to the memory address during a function call;

determining for the first function call whether the write access record set associated therewith comprises at least one record related to a same non-local memory address as that in at least one of the read access record set and the write access record set of the second function call;

responsive to the write access record set of the first function call comprising at least one record related to the same non-local memory address as that in at least one of the read access record set and the write access record set of the second function call, determining that the first function call and the second function call are dependent on each other and fail to be executable in parallel; and responsive to the write access record set of the first function call failing to comprise at least one record related to the same non-local memory address as that in at least one of the read access record set and the write access record set of the second function call, determining that the first function call and the second function call fail to be dependent on each other and are executable in parallel.

12. An emulator for tracing an execution procedure of program code, the emulator comprising:

a simulated execution environment for simulating an execution environment of a target system in which the program code will be executed sequentially; and an execution procedure tracing unit for tracing sequential execution of the program code in the simulated execution environment so as to obtain execution information of the program code, wherein the simulated execution environment generates an invocation tree for the program code based on the result of the trace obtained by the emulator, the generating comprising representing function calls of the program code in the execution procedure with nodes, wherein a root node of the invocation tree represents a main function of the program code, wherein each of a set of nodes under the root node represents a function call of the program code, and wherein invocation relations between function calls are represented by parent and child relations between corresponding nodes, wherein the simulated execution environment obtains, for at least first and second function calls represented by nodes in the invocation tree, a read access record set and a write access record set during the first and second function calls based on the execution information of the program code, the read access record set recording read accesses to a memory address during a function call, and the write access record set recording write accesses to the memory address during a function call, the simulated execution environment determines for the first function call whether the write access record set associated therewith comprises at least one record related to a same non-local memory address as that in at least one of the read access record set and the write access record set of the second function call, the simulated execution environment, responsive to the write access record set of the first function call comprising at least one record related to the same non-local memory address as that in at least one of the read access record set and the write access record set of the second function call, determines that the first function call and the second function call are dependent on each other and fail to be executable in parallel, and the simulated execution environment, responsive to the write access record set of the first function call failing to comprise at least one record related to the same non-local memory address as that in at least one of the read access record set and the write access record set of the second function call, determines that the first function call and the second function call fail to be dependent on each other and are executable in parallel.

13. The emulator according to claim 12, further comprising a trace preprocessing unit for obtaining memory type information corresponding to execution actions of the program code in the sequential procedure, the trace preprocessing unit recording the memory type information into one or more logs.

14. The emulator according to claim 12, wherein the simulated execution environment comprises:

a simulated memory for use as a memory of the simulated target system;

a memory management unit for converting a virtual address into a physical address during a memory access by the program code;

a pipeline comprising an instruction fetching unit, an instruction decoding unit, and an instruction executing unit, the pipeline fetching instructions from the simulated memory, format converting the instructions, and executing the instructions; and a simulated register for use as a register of the simulated target system.

15. The emulator according to claim 12, wherein the execution procedure tracing unit determines a type of a current instruction executed in the simulated execution environment, and:

responsive to the current instruction being a function call/return instruction for invoking a non-system API, records a current execution cycle and an ID of the invoked function into logs;

responsive to the current instruction being a function call/return instruction for invoking a memory allocation or free function among the system APIs, records a current execution cycle, an allocated memory size, and a memory address into the logs; and responsive to the current instruction being a load/store instruction, records a current execution cycle, a data address, a data size, and a read/write type into the logs.

16. A system for analyzing parallelism of program code, the system comprising:

an emulator for tracing an execution procedure of the program code, the emulator comprising:
a simulated execution environment for simulating an execution environment of a target system in which the program code will be executed sequentially; and
an execution procedure tracing unit for tracing sequential execution of the program code in the simulated execution environment so as to obtain execution information of the program code; and a parallelism analyzing unit for analyzing parallelism of the program code based on a result of the trace of the execution procedure of the program code obtained by the emulator, the parallelism analyzing unit generating an invocation tree for the program code based on the result of the trace obtained by the emulator, the generating comprising representing function calls of the program code in the execution procedure with nodes, wherein a root node of the invocation tree represents a main function of the program code, wherein each of a set of nodes under the root node represents a function call of the program code, and wherein invocation relations between function calls are represented by parent and child relations between corresponding nodes, wherein the parallelism analyzing unit obtains, for at least first and second function calls represented by nodes in the invocation tree, a read access record set and a write access record set during the first and second function calls based on the result of the trace, the read access record set recording read accesses to a memory address during a function call, and the write access record set recording write accesses to the memory address during a function call, the parallelism analyzing unit determines for the first function call whether the write access record set associated therewith comprises at least one record related to a same non-local memory address as that in at least one of the read access record set and the write access record set of the second function call, the parallelism analyzing unit, responsive to the write access record set of the first function call comprising at least one record related to the same non-local memory address as that in at least one of the read access record set and the write access record set of the second function call, determines that the first function call and the second function call are dependent on each other and fail to be executable in parallel, and the parallelism analyzing unit, responsive to the write access record set of the first function call failing to comprise at least one record related to the same non-local memory address as that in at least one of the read access record set and the write access record set of the second function call, determines that the first function call and the second function call fail to be dependent on each other and are executable in parallel.

17. The system according to claim 16, wherein the parallelism analyzing unit analyzes the parallelism based on execution actions, time information, and memory type information corresponding to the actions of the program code obtained by the emulator.

18. The system according to claim 16, wherein the parallelism analyzing unit comprises:

an access record obtaining unit for obtaining a read access record set and a write access record set for each function call of the program code in the execution procedure based on the result of the trace obtained by the emulator; and a dependency determining unit for determining, for the function calls in one function, whether there exists a dependency between these function calls based on the read access record sets and the write access record sets of the function calls.

19. The system according to claim 16, wherein the parallelism analyzing unit is configured to optimize the invocation tree by:

determining, for leaf nodes under one parent node in the invocation tree, whether there exists a memory access conflict between these leaf nodes based on their read access record sets and write access record sets during the function calls corresponding to the nodes, the invocation tree optimizing unit merging the leaf nodes having a memory access conflict among the leaf nodes under the one parent node into one node.

20. The system according to claim 16, further comprising a code/data size analyzing unit for obtaining, for each function call of the program code in the execution procedure:

a sum of code size of the function invoked by the function call and the code sizes of further functions invoked by the function invoked by the function call, as the code size of the function call, and a sum of memory space sizes accessed in memory accesses by the function call in its lifetime, as a data size of the function call.

* * * * *